Jan. 31, 1956 L. E. HOYT 2,732,820
FUEL TANK GAUGE FOR TRACTORS
Filed April 6, 1953

INVENTOR.
Leo E. Hoyt
BY
Otis A. Earl
Attorney.

United States Patent Office 2,732,820
Patented Jan. 31, 1956

2,732,820
FUEL TANK GAUGE FOR TRACTORS
Leo E. Hoyt, Climax, Mich.

Application April 6, 1953, Serial No. 347,055

5 Claims. (Cl. 116—118)

This invention relates to improvements in fuel gauges for tractors and other machines provided with fuel tanks. The principal objects of the invention are:

First, to provide an inexpensive fuel gauge for tractors that will effectively indicate when the fuel supply has fallen to a predetermined minimum and needs replenishing.

Second, to provide a gauge that is conveniently incorporated with and mounted on the fuel tank filler cap of a fuel tank.

Third, to provide a gauge and cap assembly that provides a vent into the tank while preventing splash in the tank from escaping through the vent.

Other objects and advantages of the invention will be apparent from a consideration of the following description and claims. The drawings, of which there is one sheet, illustrate a highly practical form of the invention.

Figures 1, 2:
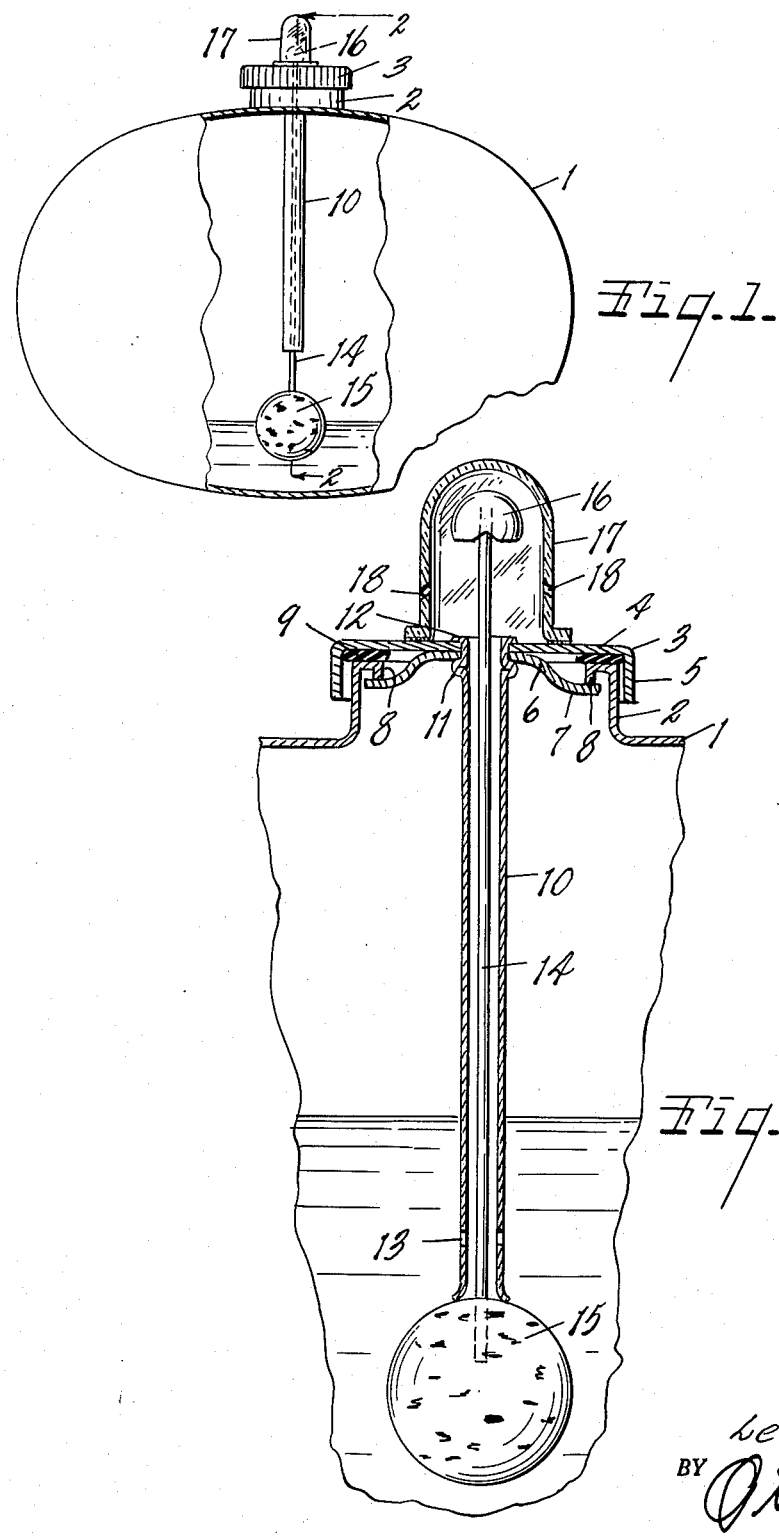
Fig. 1 is an elevational view of a tractor fuel tank partially broken away to illustrate the gauge associated therewith.
Fig. 2 is an enlarged fragmentary cross sectional view along the plane of line 2—2 in Fig. 1.

Agricultural tractors are provided with fuel tanks positioned above the engine and in front of the driver where the tank is clearly visible. Such a tank is indicated at 1. The filler neck is indicated at 2. The cap for the neck is indicated at 3 and includes a top 4 and flange 5. Secured to the underside of the top is a locking lug 6 having oppositely extending arms 7 that co-act with the cap retaining flange 8 on the neck in the usual manner. A sealing gasket for the cap is indicated at 9.

A gauge tube 10 is rigidly secured to the cap by an inner bead 11 and outer rolled end 12. The tube is adapted to extend into the tank a substantial distance and is provided with a vent hole 13 near its bottom. The low position of the vent prevents fuel from splashing out the vent and upwardly through the tube.

Freely slidable in the tube is a gauge rod 14 having a float 15 on its lower end. Secured to the top of the gauge rod is a sight ball 16. The sight ball seats on the outer rolled end 12 when the float sinks to a predetermined low point indicating a minimum reserve in the tank. The float is raised by fuel in the tank until it seats against and closes the lower end of the tube 10 as in Fig. 2. The movement of the float need not be great as it is only necessary to clearly distinguish the raised and lowered positions of the sight ball 16. The ball is notched on its under side so as not to seal the upper end of the tube.

If desired a transparent dome or shield 17 of glass or plastic may be secured over the sight disc as by adhesive or other suitable means and if used the shield must be vented as at 18.

Having thus described the invention, what I claim to be new and desire to secure by Letters Patent is:

1. A combination fuel gauge and tank cap for indicating a minimum reserve level near the bottom of a tank, comprising, a cap adapted to be lockingly engaged with a tank filler neck and having a flat top wall, a vertical tube secured adjacent its upper end to and opening through said wall and depending substantially below said wall to extend over half way into a tank, said tube having a vent opening formed through its side near the lower end thereof, a gauge rod extending through and reciprocable in said tube and having a float secured to and disposed below its lower end, said float having a surface sealingly engageable with the lower end of said tube, the lower end of the tube constituting a stop to limit upward reciprocable movement of the float and rod, and a sight element secured to the top of said rod and engageable with the upper end of the tube when said float is spaced below said tube, the distance that the float is spaced from the lower end of the tube when the sight element engages the upper end the tube being relatively small as compared to the distance the tube depends below said wall whereby the sight element is adapted to indicate a minimum reserve level in a tank by movement of the sight element through a distance which is relatively small as compared to the depth of the float and lower end of the tube in a tank.

2. A fuel gauge comprising, a cap adapted to be lockingly engaged with a tank filler neck and having a top wall, a vertical tube secured adjacent its upper end to and opening through said wall and depending substantially below said wall to extend over half way into a tank, said tube having a vent opening formed through its side near the lower end thereof, a gauge rod extending through and reciprocable in said tube and having a float secured to and disposed below its lower end, said float having a surface engageable with the lower end of said tube, the lower end of the tube constituting a stop to limit upward reciprocable movement of the float and rod, and a sight element secured to the top of said rod and engageable with the upper end of the tube when said float is spaced below said tube, the distance that the float is spaced from the lower end of the tube when the sight element engages the upper end the tube being relatively small as compared to the distance the tube depends below said wall whereby the sight element is adapted to indicate a minimum reserve level in a tank by movement of the sight element through a distance which is relatively small as compared to the depth of the float and lower end of the tube in a tank.

3. In combination with a fuel tank having a filler neck in its upper wall, a cap detachable secured to said neck, a tube secured to said cap and depending a substantial distance into said tank, said cap having a hole therein opening to said tube, said tube having a vent formed through its wall near its lower end, a rod extending through said tube, a float secured to the bottom of said rod, the lower end of the tube constituting a slot to limit upward movement of the float, and a sight element on the top of said rod engageable with means comprising said cap and the upper end of the tube when said float is positioned near the bottom of said tank, said tube terminating a short distance above the lowered position of said float whereby said sight element and float rise only a limited distance in response to increased liquid level in said tank, said float sealingly engaging the end of said tube in the raised position of the float to prevent further rise of the float and rod by holding the float submerged when the liquid level in the tank exceeds a predetermined minimum.

4. In combination with a fuel tank having a filler neck in its upper wall, a cap detachable secured to said neck, a tube secured to said cap and projecting downwardly into the interior of said tank, said cap having a hole therein opening to said tube, a rod extending through said tube, a float secured to the bottom of said rod, the lower end of the tube constituting a slot to limit upward movement of the float, and a sight element on the top of said rod engageable with means comprising said cap and the upper end of the tube when said float is positioned near the bottom of said tank, said tube terminating a short distance above the lowered position of said float whereby said sight element and float rise only a limited distance in response to increased liquid level in said tank, said float engaging the end of said tube in the raised position of the float to prevent further rise of the float and rod by holding the float submerged when the liquid level in the tank exceeds a predetermined minimum.

5. In a liquid gauge for indicating a minimum reserve level in a tank near the bottom thereof, a vertical tube, means at the upper end of the tube for supporting said upper end in an opening through the upper wall of a tank with the tube depending a substantial distance below said supporting means to extend a substantial distance into a tank, a gauge rod extending through and reciprocable in said tube, a float fixed to the rod and disposed below the lower end of the tube, a sight element fixed to the rod and disposed above said supporting means and the upper end of the tube, the lower end of the tube constituting means for limiting upward reciprocating movement of the float, rod and sight element, the distance the sight element is disposed above said supporting means and the upper end of the tube when the float engages the lower end of the tube being relatively small as compared to the distance the tube depends below said supporting means into a tank whereby the sight element is adapted to indicate a minimum reserve level in a tank by a movement of the sight element which is relatively small as compared to the depth of the float and lower end of the tube in a tank.

References Cited in the file of this patent

UNITED STATES PATENTS

| | | |
|---|---|---|
| 1,432,385 | Conners | Oct. 17, 1922 |
| 1,516,614 | MacLellan | Nov. 25, 1924 |
| 2,400,228 | Franz et al. | May 14, 1946 |
| 2,510,663 | Schuessler | June 6, 1950 |